July 25, 1939.  J. M. STOVER, JR  2,167,593
VEHICLE
Filed April 13, 1938  2 Sheets-Sheet 1
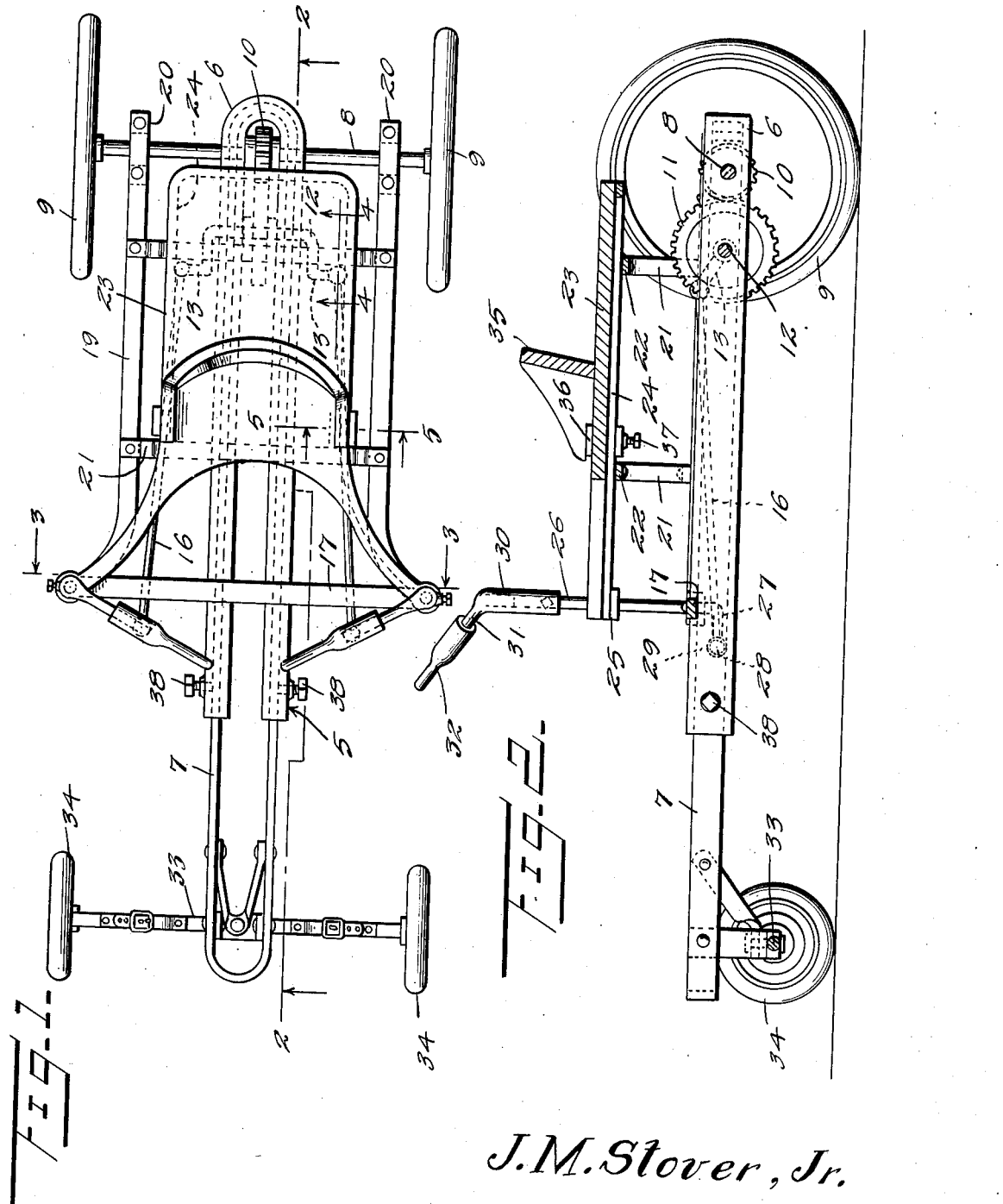
J.M.Stover, Jr.
INVENTOR
BY Victor J. Evans & Co.
ATTORNEYS.

July 25, 1939.　　　　J. M. STOVER, JR　　　　2,167,593
VEHICLE
Filed April 13, 1938　　　2 Sheets-Sheet 2
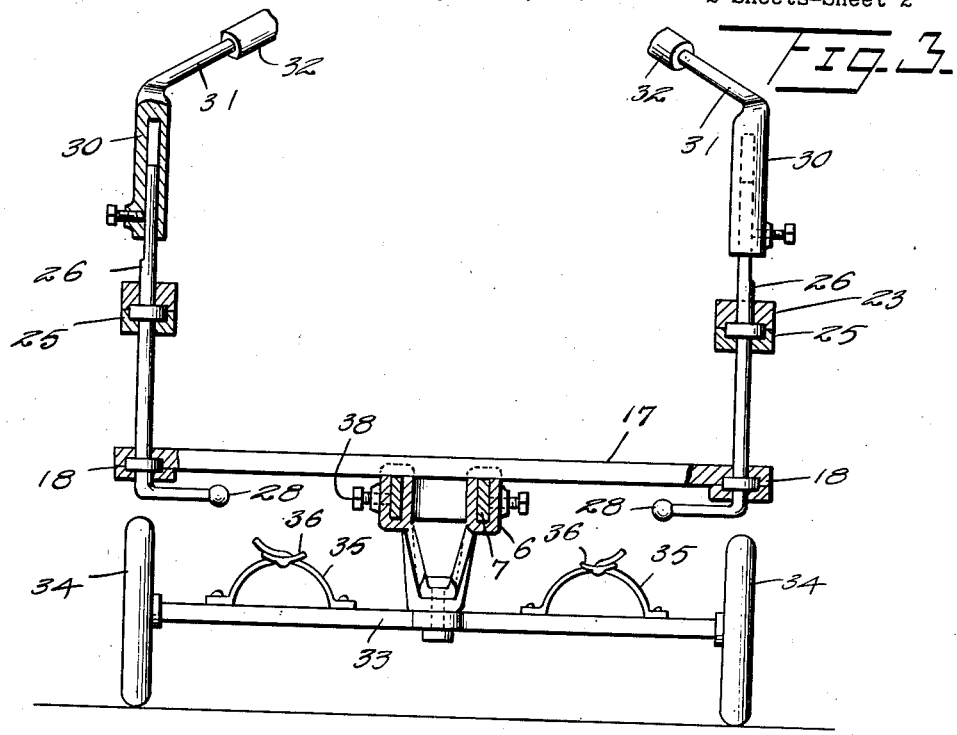
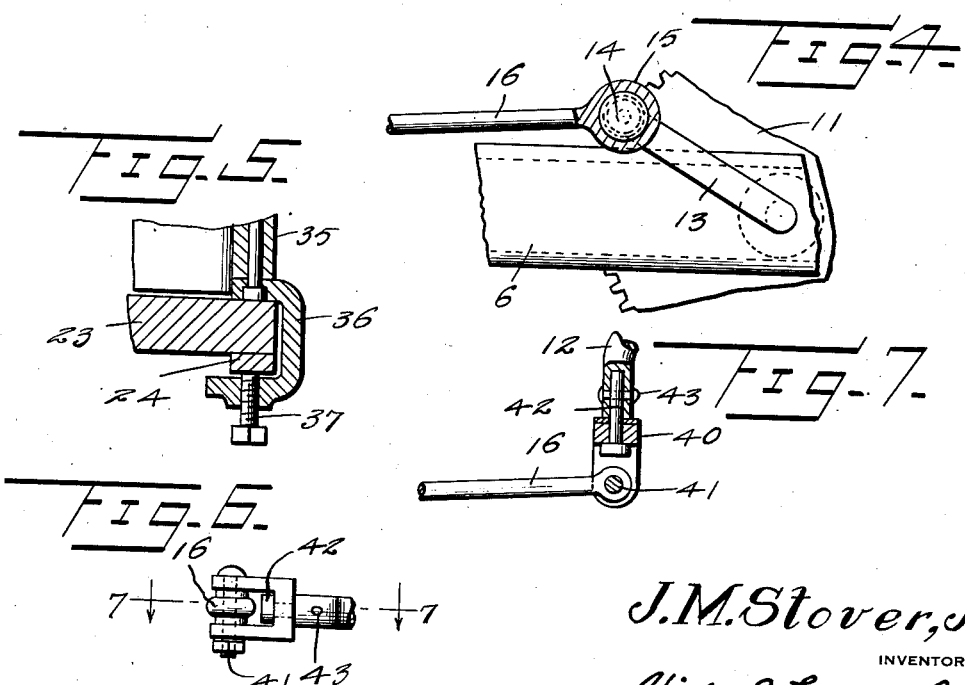
J. M. Stover, Jr.
INVENTOR

UNITED STATES PATENT OFFICE 2,167,593

VEHICLE

Joseph M. Stover, Jr., Palouse, Wash.

Application April 13, 1938, Serial No. 201,833

1 Claim. (Cl. 280—248)

My invention relates to vehicles and more particularly to manually propelled vehicles.

One of the principal objects of my invention is to provide a manually propelled vehicle which is adapted to be propelled by the movements of the arms in a manner to simulate the rowing of a boat or the like.

Another object of my invention is to provide a vehicle of the above described character so constructed and arranged as to effect physical exercising of the occupant or operator thereof in a manner similar to that obtained in rowing a boat or the like.

A further object of my invention is to provide a vehicle of the above described character which is simple in construction, durable in use, highly efficient as an exercising medium and economical in manufacture.

Other objects and advantages will be apparent from the following description, appended claim and annexed drawings.

Referring to the drawings wherein like reference characters designate like parts throughout the several views:

Figure 1 is a top plan view of my invention.

Figures 2, 3, 4 and 5 are sectional views taken on the lines 2—2, 3—3, 4—4 and 5—5 of Figure 1, respectively.

Figure 6 is a modified form of a connection employed between the connecting rod and crank arm or drive shaft.

Figure 7 is a detail sectional view taken on the line 7—7 of Figure 6.

In practicing my invention, in the preferred embodiment illustrated in Figures 1 to 5 inclusive, I provide a frame 5 having a U-shaped tubular rearwardly extending section 6 in which is telescopically mounted a U-shaped forwardly extending section 7. Journaled through the rear end of the section 6 is an axle 8 having fixed to the ends thereof a pair of traction wheels 9. Said axle has also fixed thereto, intermediate of the ends thereof and between the spaced portions of the section 6, a driven gear 10 in mesh with a drive gear 11 fixed to a crank arm 12 journaled in the section 6 adjacent the axle 8. The crank arm 12 is fashioned with offset end sections 13 formed with ball shaped ends 14 operably mounted within the housings 15 fashioned on the rear ends of connecting rods 16. Said housings and ball shaped ends constitute ball and socket joints.

Welded or otherwise secured to the forward end of the section 6 is a transversely extending frame member 17, the outer ends of which form bearings 18 for a purpose hereinafter described. Secured to the outer ends of the frame member 17 are front ends of spaced longitudinally extending support members 19, the rear ends of which are provided with bearings 20 in which the axle 8 is rotatably mounted. Secured to the support members 19 are a pair of spaced cross bars 21 having an offset intermediate section 22 on which is mounted a seat 23 having a marginally extending brace 24 secured to the lower face thereof.

The forward ends of the seat 23 and brace 24 are curved outwardly and formed with bearings 25 in registry with the bearings 18 for accommodating therethrough vertically extending operating shafts 26. The lower ends of said shafts 26 are fashioned with offset sections 27 having ball shaped ends 28 for operation within housings 29 formed on the forward ends of the connecting rods 16 whereby oscillating movement of the shafts 26 serves to drive the wheels 9 through the medium of the parts heretofore described. The upper ends of the shafts 26 have secured thereover sleeves 30 terminating in angularly disposed offset portions 31 equipped with oar handles 32. The forward end of the frame section 7 has pivoted thereto a front axle 33 equipped with wheels 34. Said front axle is provided with spaced straps 35 having buckles 36. Said straps are adapted to accommodate the feet of an operator occupying the seat 23. The seat 23 is equipped with a back 35 fashioned with laterally extending U-shaped sections 36 embracing the sides of the seat and the brace 24.

The U-shaped sections 36 are equipped with set screws 37 for engagement with the brace 24 whereby to secure the back 35 in a fixed position on said seat. Loosening of the set screws 37 permits horizontal adjustment of the back. The frame sections 6 and 7 are adjustably secured together by means of similar set screws 38 carried by the forward end of the section 6 whereby to permit lengthwise adjustment of the frame 5.

From the foregoing it will be apparent that when an operator is seated on the seat 23 the feet engaging the axle 33 and extending through the straps 35, he or she may readily steer the vehicle in a desired direction and by grasping the oar handles 32 and imparting an alternate pull and push thereto easily cause the vehicle to be operated in a forward or reverse direction as desired.

While I have illustrated and described the connecting rod 16 as equipped with ball and socket joints for effecting connection with the crank arm 12 and the end of the shaft 26, a universal joint may also be employed if desired. As illustrated in Figures 6 and 7 said universal joint comprises a bifurcated member 40 having pivoted thereto one end of the connecting rod 16 by means of a pivot pin 41. The bifurcated member 40 is swivelly connected to the shaft 26 or to the end of the crank arm 12 by means of a bolt 42 secured to said arm or shaft by means of a rivet 43 as clearly illustrated in Figure 7.

Obviously, the rowing action thus required to operate the vehicle provides the operator with exercise on the forward stroke as well as on the pulling stroke. On the pull stroke the device provides excellent exercising movements for complete muscular action and even at the end of said stroke there is a free arm movement with the broadening effect on the chest and back. The pull stroke also provides strengthening exercise for the hands, forearms, biceps, shoulders, chest, back, heart and lungs and even the legs are benefited by the muscular tension as the result of the action as the operator pulls the oar handles. On the forward stroke exercise is imparted to the legs, triceps, shoulders, forearms, abdomen and upper back. As the oar handles are moved in the forward or backward movement the operator's arms are in a position to provide most natural muscular action without any cramping of the chest, abdomen or the arm movements. Also, by the use of the pair of oar handles and by the feet secured in the loops of the straps 35 the operator is firmly seated and gives a feeling of perfect physical balance conducive to best exercising posture.

What I claim is:

A device of the character described, comprising, a frame equipped with adjustable sections, a transversely extending member secured across one of said sections, a seat having an adjustable back mounted over said frame and provided with outwardly extending ends terminating over the ends of said member and defining a leg space therebetween, shafts mounted in said member and the ends of said seat, oar handles secured to said shafts and extending in angular relation thereto and over said space, wheeled axles supporting said sections, and means connecting said shafts to one of said axles for operating the latter to propel said device in a manner to simulate a rowing operation.

JOSEPH M. STOVER, Jr.